United States Patent [19]

Enga

[11] 4,396,009
[45] Aug. 2, 1983

[54] HELIOTROPIC WIDE SPECTRUM SOLAR PANEL

[76] Inventor: James N. Enga, Rte. 3, Box 39, Madison, S. Dak. 57042

[21] Appl. No.: 233,129

[22] Filed: Feb. 10, 1981

[51] Int. Cl.³ ............................................. F24J 3/02
[52] U.S. Cl. ................................. 126/450; 126/429; 126/437; 126/449
[58] Field of Search ............... 126/449, 428, 432, 448, 126/450

[56] References Cited

U.S. PATENT DOCUMENTS 4,120,283 10/1978 Eder .................................... 126/448
4,223,665 9/1980 Lowe ................................... 126/449
4,278,072 7/1981 Ryan et al. .......................... 126/449

Primary Examiner—Albert J. Makay
Assistant Examiner—Henry Bennett
Attorney, Agent, or Firm—Harvey B. Jacobson

[57] ABSTRACT

An elongated shallow housing is provided including a closed lower side, an open upper side opposite the lower side and opposite ends between which said lower side extends. The open side includes a transparent panel secured thereover and a plurality of longitudinal side-by-side elongated trough members are disposed within the housing for absorbing solar energy incident thereon passing through the transparent panel. The trough members open forwardly toward the transparent panel and are spaced therefrom. The opposite ends of the housing include inlet and outlet air manifolds opening into the opposite ends of the trough members and the area within the housing between the trough members and the transparent panel and also into the interior of the housing below the trough members. Air inlet and outlet structure is provided and opens into the inlet and outlet manifolds and the housing includes a heat insulation panel disposed between the trough members and the closed lower side of the housing. Adjacent marginal edges of the trough members define openings therebetween spaced longitudinally along the trough members communicating the lower portion of the interior of the housing below the trough members with the upper portion of the interior of the housing above the trough members and the housing includes a plurality of elongated longitudinally spaced transverse members including tongue portions projecting down into and partially blocking the flow of air passing through the trough members.

6 Claims, 9 Drawing Figures

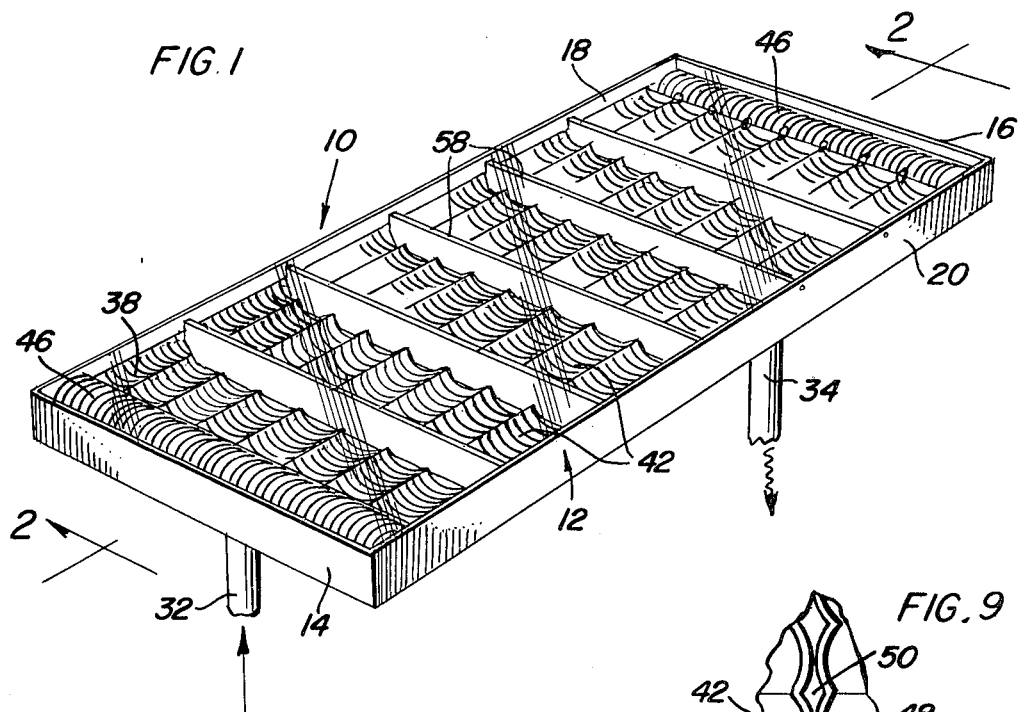
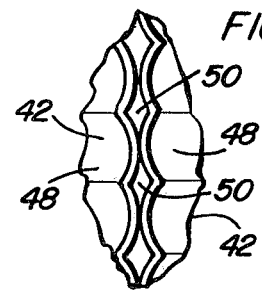
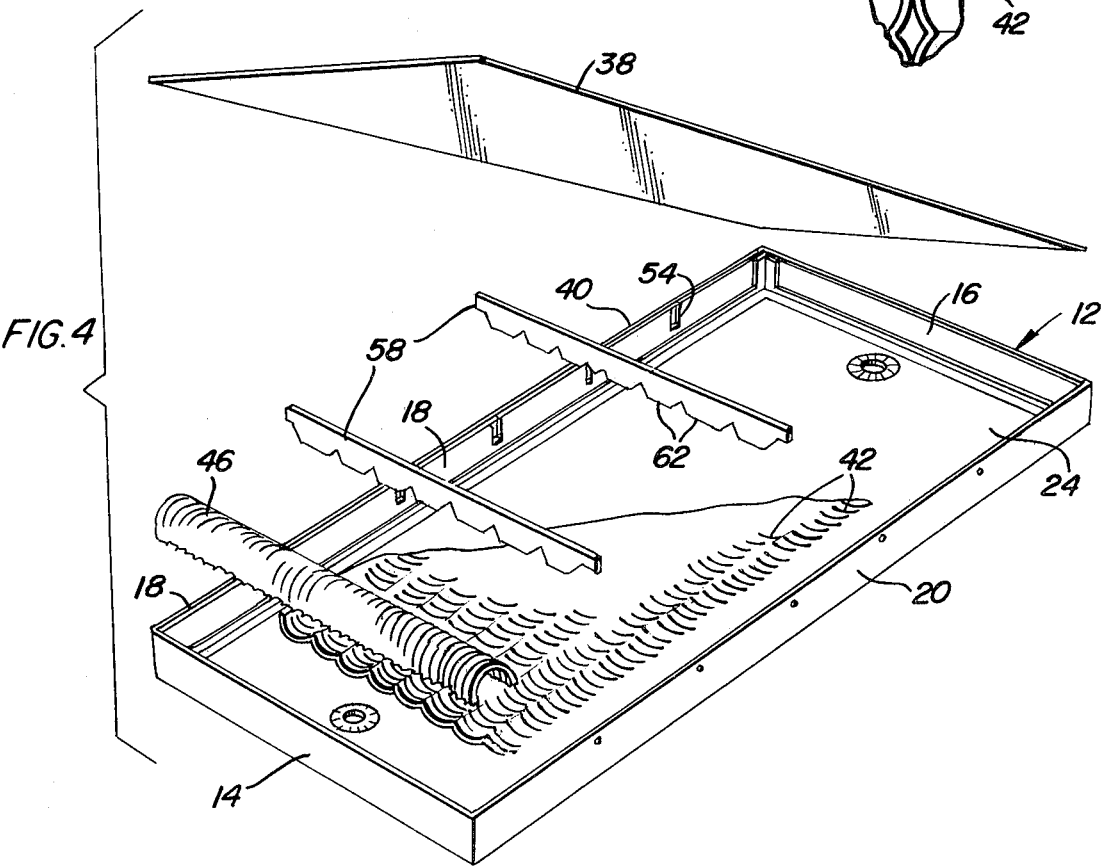

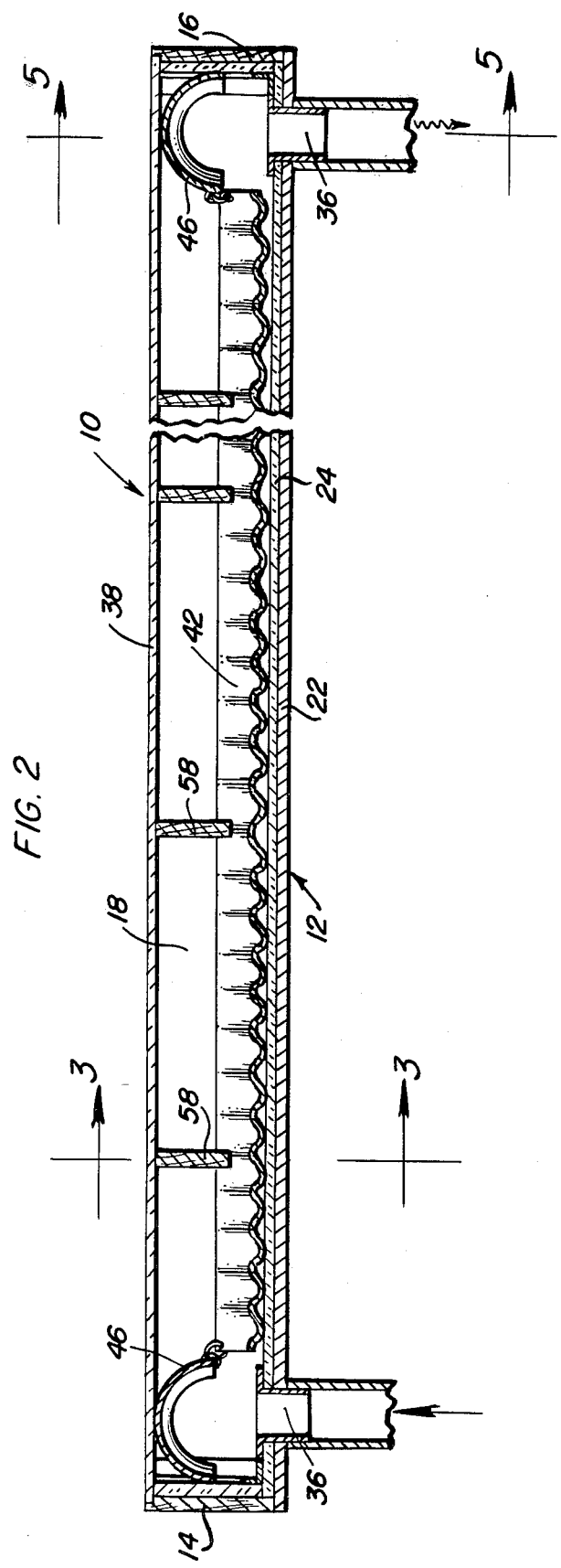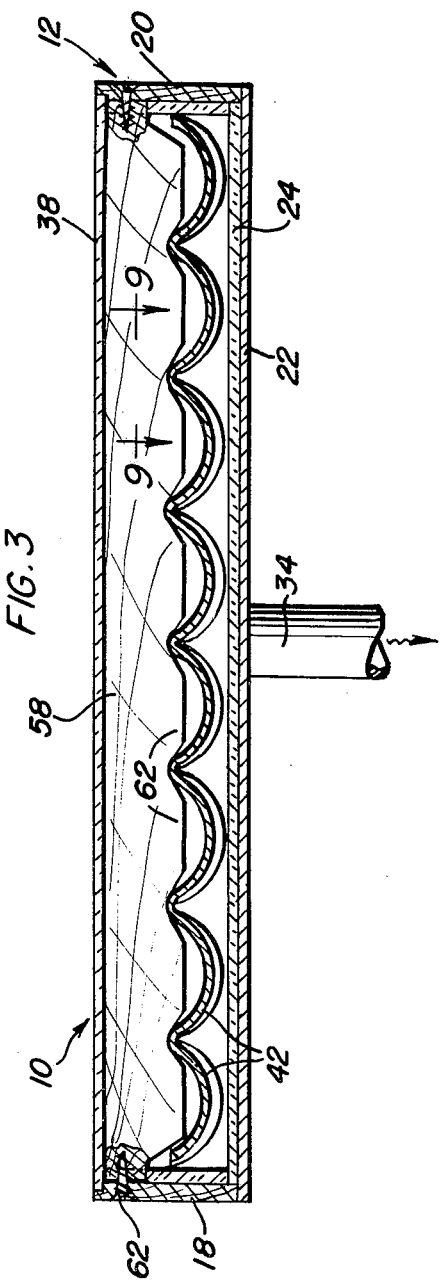

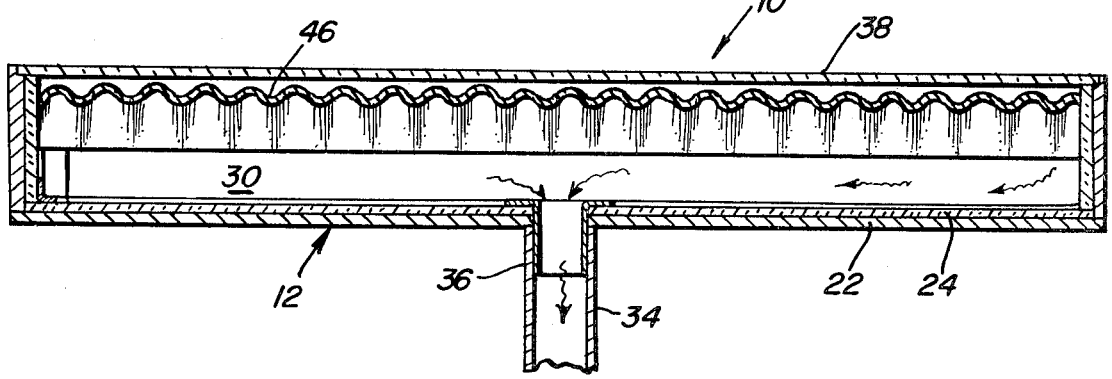
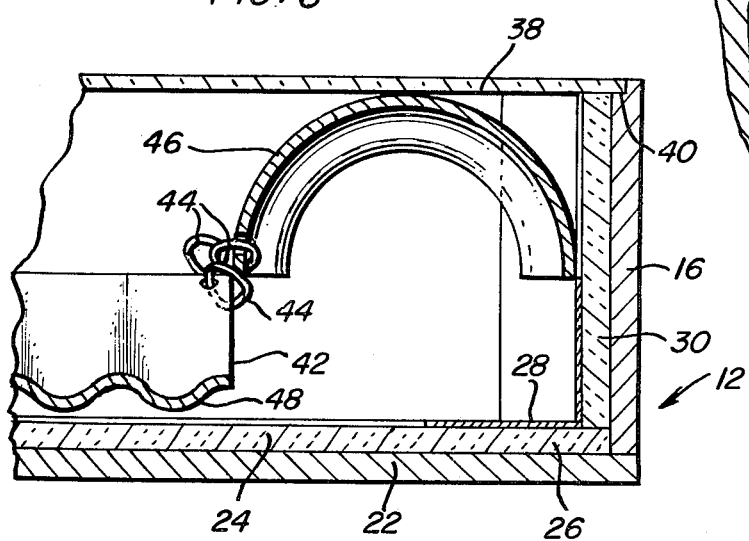
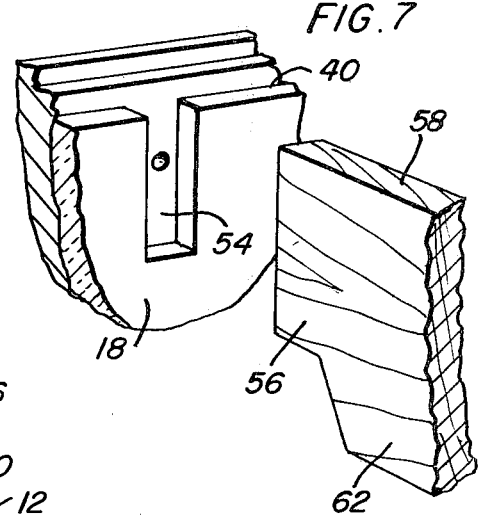
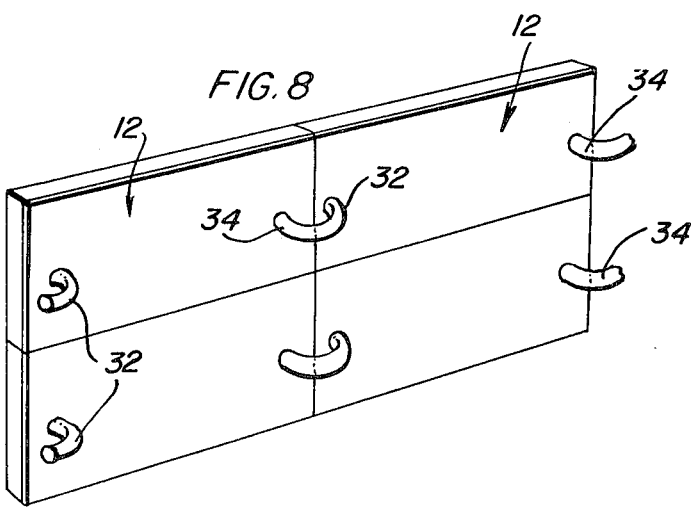

4,396,009

HELIOTROPIC WIDE SPECTRUM SOLAR PANEL

BACKGROUND OF THE INVENTION

Various forms of solar panels designed to collect solar energy incident thereon for the purpose of heating a fluid exchange medium such as air heretofore have been designed, but most of these previously known forms of panels, such as those disclosed in U.S. Pat. Nos. 3,369,539, 4,068,652, 4,091,797, 4,120,283, 4,128,095, 4,187,832 and 4,191,170, are specifically designed to effect turbulent or repeated fluid medium flow therethrough and do not concentrate upon efficiency of solar heat absorption and simplicity of design, whereby an efficient and inexpensive solar heat collector panel may be provided. Accordingly, a need exists for an improved form of solar heat collector panel which is highly efficient and may be readily produced at a minimum of cost.

BRIEF DESCRIPTION OF THE INVENTION

The solar collector panel of the instant invention comprises a shallow rectangular housing having a closed lower side and an open front side over which a transparent panel is mounted. The interior of the housing includes longitudinally extending elongated and forwardly opening trough members disposed in side-by-side relation and the opposite ends of the solar panel include inlet and outlet manifolds which open not only into the interior of the trough members but also the area of the interior of the housing between the closed lower side thereof and the trough members. Further, structure is provided for admitting heat transfer fluid into the inlet manifold and discharging heated fluid medium from the outlet manifold. The transparent panel is spaced from the open upper sides of the trough members and the housing includes elongated transversely extending bracing members disposed between the open upper sides of the trough members and transparent panel and including tongue portions which project down into the trough members to partially restrict the flow of fluid heat transfer medium therethrough. Still further, the adjacent longitudinal marginal edges of the trough members define openings spaced longitudinally along the trough members communicating the lower interior of the housing behind the trough members with the front portion of the interior of the housing disposed above the open sides of the trough members below the transparent panel.

The main object of this invention is to provide a solar energy collector panel which is efficient in operation and which may be constructed of inexpensive materials so as to provide a collector panel which may enjoy commercial success.

Another object of this invention is to provide a solar energy collector panel particularly well adapted to utilize air as the heat transfer medium passes therethrough.

Still another important object of this invention is to provide a solar heat collector panel constructed in a manner whereby the panel will not be overly sensitive to exact positioning in relation to the sun and which may therefore be more efficient when stationarily mounted.

A further object of this invention is to provide a solar energy collector panel which may be efficiently operatively connected to additional solar panels in either parallel or series relation.

A final object of this invention to be specifically enumerated herein is to provide a solar collector panel in accordance with the preceding objects and which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a single solar collector panel constructed in accordance with the present invention;

FIG. 2 is an enlarged longitudinal vertical sectional view taken substantially upon the plane indicated by the section line of 2—2 of FIG. 1;

FIG. 3 is a transverse vertical sectional view taken substantially upon the plane indicated by the section line 3-3 of FIG. 2;

FIG. 4 is an exploded perspective view of the solar collector panel;

FIG. 5 is a vertical sectional view taken substantially upon the plane indicated by the section line 5—5 of FIG. 2;

FIG. 6 is an enlarged fragmentary vertical sectional view illustrating the right-hand portion of FIG. 2 in greater detail;

FIG. 7 is a fragmentary exploded perspective view illustrating the manner in which the heat transfer medium flow restricting transverse members are secured between the opposite side longitudinal members of the solar collector panel;

FIG. 8 is a perspective view illustrating the manner in which a plurality of adjacent solar collector panels may be operatively connected in both series and parallel; and FIG. 9 is an enlarged fragmentary sectional view taken substantially upon the plane indicated by the section line 9—9 of FIG. 3.

DETAILED DESCRIPTION OF THE INVENTION

Referring now more specifically to the drawings, the numeral 10 generally designates the solar collector panel of the instant invention. The panel 10 includes a housing referred to in general by the reference numeral 12 including a pair of opposite end walls 14 and 16 interconnected by a pair of opposite side longitudinal walls 18 and 20. The housing 12 includes a bottom or rear side wall 22 extending and secured between the lower marginal edges of the walls 14, 16, 18 and 20, and the bottom wall 22 includes a panel 24 of heat insulative material disposed thereover having a radient heat and light reflective upper surface 28. In addition, the interior surfaces of the walls 14, 16, 18 and 20 also have similar panels 30 secured thereover.

In that form of the invention illustrated, the housing 12 includes a fluid heat transfer medium inlet tube 32 opening into the interior of one end of the housing 12 through the bottom wall 22 and an outlet tube 34 opening outwardly of the interior of the housing at the other end thereof through the bottom wall 22. A suitable tubular fitting 36, see FIG. 2, is utilized to communicate the upper ends of the tubes 32 and 34 with the interior of the housing 12 with the fittings 36 passing through the panel 24 and the bottom wall 22. The upper ends of the tubes 32 and 34 are telescoped over the depending outer ends of the fittings 36.

The upper side of the housing 12 is closed by a transparent panel 38 seated in rabbited upper marginal edges 40 of the walls 14, 16, 18 and 20 and the interior of the housing 12 has a plurality of upwardly opening side-by-side corrugated semi-cylindrical trough members 42 disposed therein. The lower marginal edges of the trough members 42 rest upon, or may be spaced above, the panel 26 and the opposite ends of the trough members 42 terminate spaced distances from the corresponding ends of the housing 12. Adjacent marginal edges of the trough members 42 are joined together through the utilization of attaching rings 44 and opposite end inverted manifold defining corrugated and semi-cylindrical trough members 46 are mounted in the opposite ends of the housing 12 and anchored relative to the corresponding ends of the trough members 44 through the utilization of additional attaching rings 44. The trough members 42 and 46 may be identically formed, although the trough members 46 may be shorter than the trough members 42. Further, it is pointed out that the corrugations 48 of the trough members 42 and 46 may be disposed substantially normal to the longitudinal center lines of the trough members 42 and 46, or slightly inclined relative to positions disposed normal to the trough member center lines.

As may be seen from FIG. 9 of the drawings, the corrugated trough members 42 are disposed in side-by-side contacting relation with the corrugations 48 thereof laterally registered whereby longitudinally spaced openings 50 are defined between adjacent longitudinal marginal edges of the trough members 42 and communicate the lower portion of the interior of the housing 12 beneath the trough members 42 with the upper portion of the interior of the housing 12 into which the trough members 42 open.

Longitudinally spaced portions of the upper marginal edges of the longitudinal walls 18 and 20 are notched as at 54, see FIG. 7, and the opposite end portions 56 of elongated transverse baffles or braces 58 are anchored in the notches 54 through the utilization of attaching screws 60. The baffles 58 include longitudinally spaced depending tongue portions 62 which project down into corresponding trough members 42 and serve to slightly restrict the flow of heat transfer fluid (air) therethrough.

A plurality of the housings 12 may be connected together in series in the manner illustrated in FIG. 8 of the drawings with the outlet tube 34 of one housing connected to the inlet tube 32 of an adjacent housing. Further, the inlet tubes 32 at the left of FIG. 8 may be coupled to a fluid transfer medium supply plenum and the outlet tubes 34 disposed at the right of FIG. 8 may open into a return fluid heat transfer medium plenum. Thus, the housings 12 may be connected together both in series and in parallel.

The trough members 42 and 46 are constructed from a polymorphus substance containing carbon black and possibly other ingredients which will maximumly absorb heat from solar radiation thereon. The trough members 42 and 46 are constructed of a thickness of approximately 6 one hundredths of a inch for rapid transfer of heat therethrough and the insulation panels 26 and 30 may comprise one-half inch panels constructed of polyurethane insulation sheathed with aluminum to define the surface 28. The walls of the housing may be constructed of wood and the transparent panel 38 may be constructed of glass or plastic.

It is proposed that the standard size housing will be 4 feet wide and 8 feet long and have a depth of approximately 6 inches. Also, if air is to be utilized as the heat transfer medium, suitable blower means (not shown) will be provided sufficient to cause movement of air through the troughs 48 and below the latter at a rate of between 5 feet per second and 16 feet per second.

When the housings are positioned with the trough members 42 inclined and the trough members 46 horizontally disposed, air is pumped through the housings 12 so that the air moves upwardly therethrough. As the air moves upwardly through the housings, it moves through the trough members 42 as well as below the latter and the tongue portions 62 which project downwardly into the trough members 42 tend to maintain a dead air space between the upper marginal edges of the trough member 42 and the transparent panel 38, even though air is flowing through the trough members 42. Of course, the corrugations 48 serve to prevent heat insulative boundary layers from forming immediately adjacent the inner and outer surfaces of the trough members 42.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A solar energy collector including a shallow housing having a closed rear side, an open upper side opposite said closed rear side and opposite ends between which said closed side extends, said open side including a transparent panel secured thereover, a plurality of individual elongated side-by-side trough members disposed within said housing and extending between said opposite ends for absorbing solar energy incident theron passing through said panel, said trough members opening laterally toward said panel and being spaced therefrom, the opposite ends of said housing including inlet and outlet air manifold means opening into the opposite ends of said trough members and the area within said housing between said trough members and said transparent panel and also opening into the interior of said housing outwardly of said trough members and between the latter and said closed rear side, air inlet and outlet means opening into said inlet and outlet manifold means from the exterior of said housing, said trough members including transverse corrugation, heat insulation means disposed beneath said trough members and between said closed rear side and said trough members, said heat insulation including a heat and light reflective surface opposing said trough members, the adjacent longitudinal marginal edges of said corrugated trough members being abutted together with the adjacent ends of the corrugations thereof defining openings between adjacent trough members spaced longitudinally along said trough members and communicating the lower portion of the interior of said housing below said trough members with the upper portion of the interior of said housing disposed above said trough members and between the latter and said transparent panel.

2. The combination of claim 1 wherein said housing includes a plurality of elongated members extending transversely of said trough members and disposed between said transparent panel the open side of said trough members.

3. The combination of claim 2 wherein said transverse members include longitudinally spaced tongue portions projecting downwardly into and partially blocking the flow of fluid heat transfer medium passing through said trough members.

4. The combination of claim 3 including heat insulation means disposed beneath said trough members and between said closed rear side and said trough members.

5. The combination of claim 3 wherein said inlet and outlet air manifold means comprise inverted trough members extending transversely of the opposite ends of said housing and into which the opposite ends of the first mentioned trough members open.

6. The combination of claim 5 including heat insulation means disposed beneath said trough members and between said closed rear side and said trough members.

* * * * *